(12) United States Patent
Barry et al.

(10) Patent No.: US 11,982,770 B2
(45) Date of Patent: May 14, 2024

(54) METHODS AND APPARATUS FOR HISTOGRAMMING

(71) Applicant: SEMICONDUCTOR COMPONENTS INDUSTRIES, LLC, Phoenix, AZ (US)

(72) Inventors: Colin Barry, Waterford (IE); Steven John Buckley, Henlow (GB); Aidan Browne, Cork (IE)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 616 days.

(21) Appl. No.: 17/247,097

(22) Filed: Nov. 30, 2020

(65) Prior Publication Data
US 2022/0171037 A1    Jun. 2, 2022

(51) Int. Cl.
| | |
|---|---|
| *G01S 7/4865* | (2020.01) |
| *G01S 7/481* | (2006.01) |
| *G01S 7/487* | (2006.01) |
| *G01S 17/10* | (2020.01) |

(52) U.S. Cl.
CPC .......... *G01S 7/4865* (2013.01); *G01S 7/4814* (2013.01); *G01S 7/4816* (2013.01); *G01S 7/487* (2013.01); *G01S 17/10* (2013.01)

(58) Field of Classification Search
CPC .... G01S 7/4865; G01S 7/4814; G01S 7/4816; G01S 17/10
See application file for complete search history.

(56) References Cited

U.S. PATENT DOCUMENTS

| | | | | |
|---|---|---|---|---|
| 2017/0052065 | A1* | 2/2017 | Sharma | G01S 17/18 |
| 2017/0176577 | A1* | 6/2017 | Halliday | H01S 5/183 |
| 2019/0049243 | A1* | 2/2019 | Jung | G01S 7/4865 |
| 2020/0209392 | A1* | 7/2020 | Sadhu | G06T 7/521 |
| 2021/0199802 | A1* | 7/2021 | Mautner | G01S 7/487 |
| 2021/0302550 | A1* | 9/2021 | Dutton | G01S 17/89 |
| 2021/0302553 | A1* | 9/2021 | Palubiak | G01S 7/4816 |

OTHER PUBLICATIONS

Vornicu, Ion et al., Compact Real-Time Inter-Frame Histogram Builder for 15-Bits High-Speed ToF-Imagers Based on Single-Photon Detection, IEEE Sensors Journal, vol. 19, No. 6, pp. 2181-2190, Mar. 15, 2019.

Kumar, Vibhor et al., Denoising with flexible histogram models on minimum description length principle, IEEE Transactions on Signal Processing, vol. 54, pp. 2922-2928, 2006.

* cited by examiner

*Primary Examiner* — Isam A Alsomiri
*Assistant Examiner* — Joseph C Fritchman
(74) *Attorney, Agent, or Firm* — Treyz Law Group, P.C.; Joseph F. Guihan

(57) ABSTRACT

Various embodiments of the present technology may provide methods and apparatus for region of interest histogramming. The apparatus may use a state machine in conjunction with a memory to generate a first histogram having a fixed number of bins over a first range and generate a second histogram having the fixed number of bins over a region of interest selected based on the first peak of the first histogram.

19 Claims, 5 Drawing Sheets

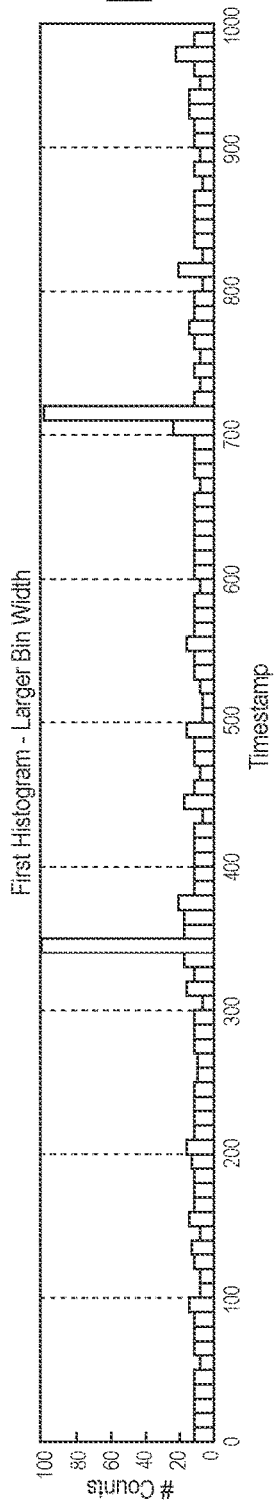
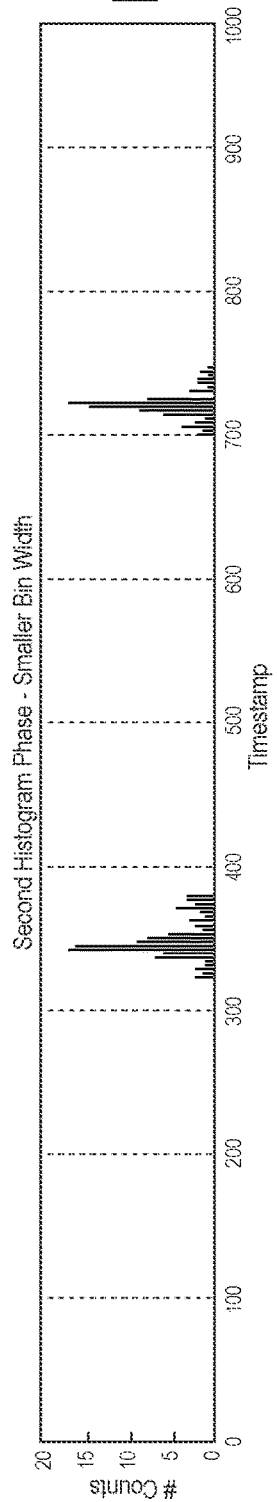
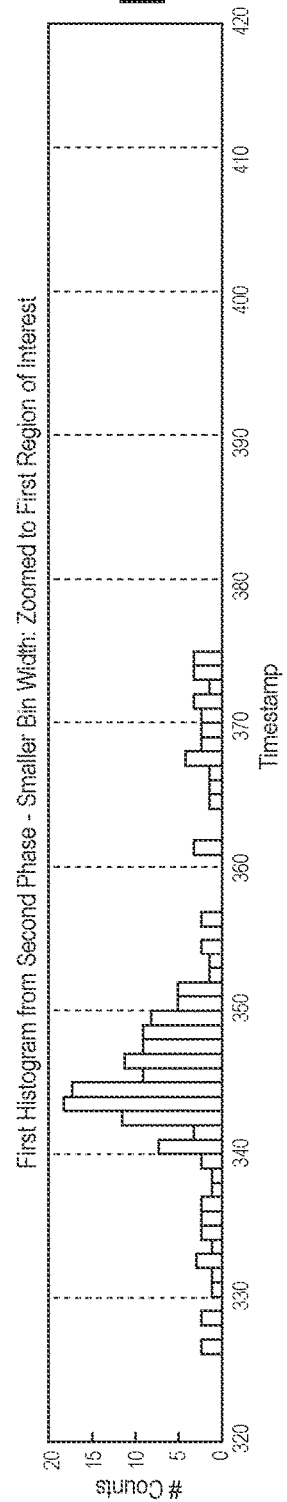
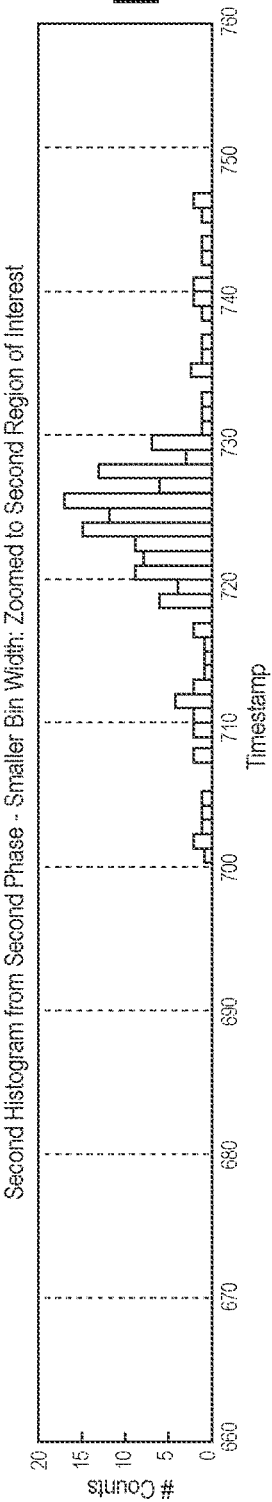

METHODS AND APPARATUS FOR HISTOGRAMMING

BACKGROUND OF THE TECHNOLOGY

Active ranging systems, such as a time of flight LiDAR system, often create a histogram in memory based on time events generated by an optical detector (e.g., a single-photon avalanche diode (SPAD) array) and a time-to-digital converter (TDC). The peak of the histogram is used to determine the travel time of a transmitted laser signal to return to the optical detector from the initial transmission. In some cases, the amount of memory required to create the histogram may increase the chip to an impractical size. For example, typical requirements specify a LiDAR uncertainty of no more than 0.1%. For long range LiDAR (300 m range), ~2 ns TDC LSB is required to meet 0.1% uncertainty. For short range LiDAR (3 m range), ~20 ps TDC LSB is required to meet 0.1% uncertainty. In order to achieve 20 ps TDC LSB over a 300 m range, a 17-bit TDC is required, and for a 640×480 pixel SPAD array, 60 MB of on-chip memory would be required, which is not practical.

A system that increases time of fight resolution at all ranges, lowers memory requirements, is suitable for long range and short range LiDAR systems, reduces TDC size requirements, and can perform quickly without limiting the system frame rate may be desired.

SUMMARY OF THE INVENTION

Various embodiments of the present technology may provide methods and apparatus for region of interest histogramming. The apparatus may use a state machine in conjunction with a memory to generate a first histogram having a fixed number of bins over a first range and generate a second histogram having the fixed number of bins over a region of interest selected based on the first peak of the first histogram.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 4A:
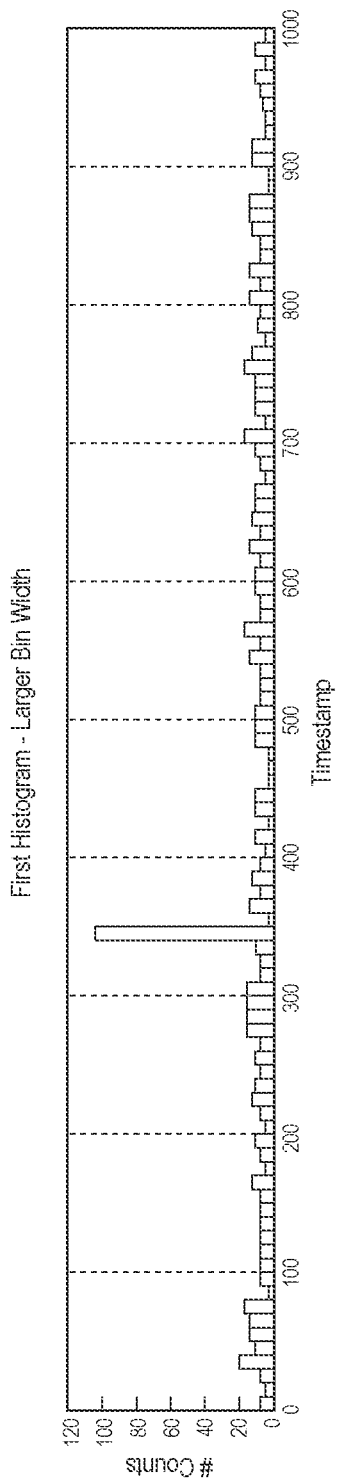
Figure 4B:
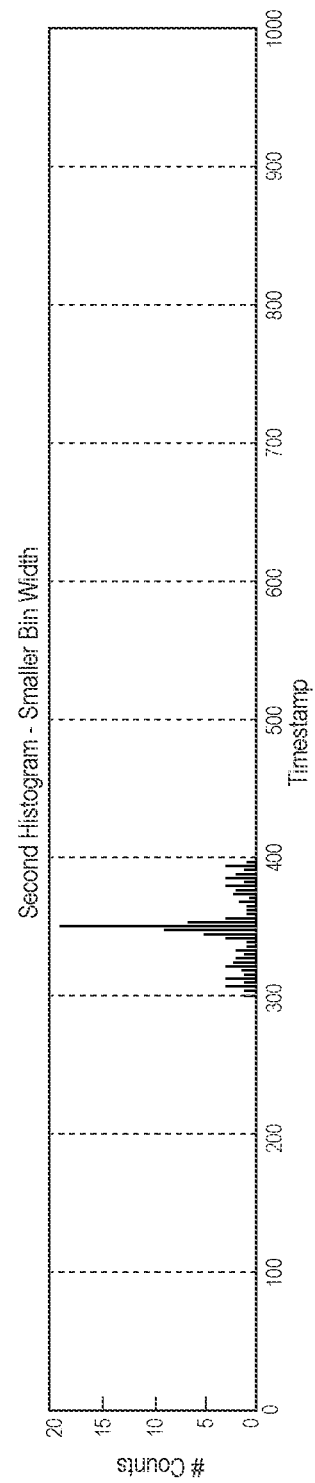
Figure 4C:
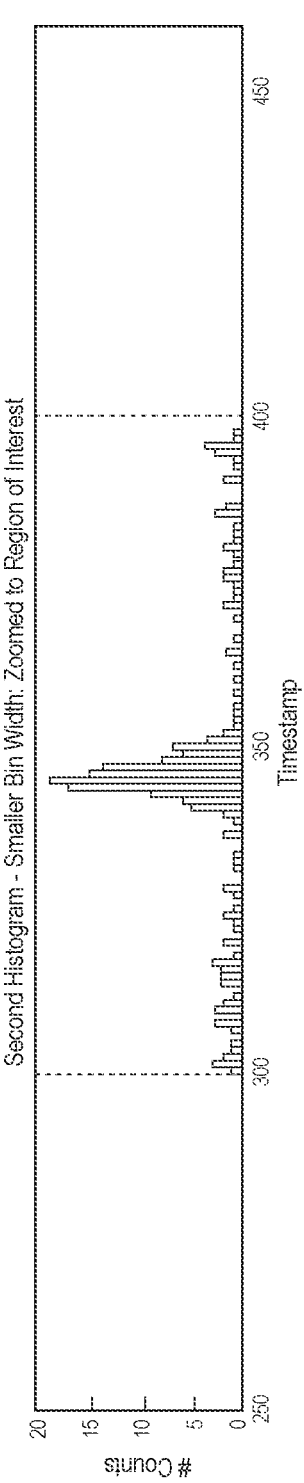

FIG. 4A representatively illustrates a histogram from a first histogram phase in accordance with an exemplary embodiment of the present technology;

FIGS. 4B-4C representatively illustrates a histogram from a second histogram phase in accordance with an exemplary embodiment of the present technology;

FIG. 5A representatively illustrates a histogram from a first histogram phase in accordance with an exemplary embodiment of the present technology; and FIGS. 5B-5D representatively illustrates multiple histograms from a second histogram phase in accordance with an exemplary embodiment of the present technology.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various logic gates, counters, state machines, memory, time-to-digital converters, and the like, which may carry out a variety of functions. In addition, the present technology may be integrated in any number of electronic systems, such as automotive, aviation, surveillance, "smart devices," and consumer electronics, and the systems described are merely exemplary applications for the technology.

Figure 1:
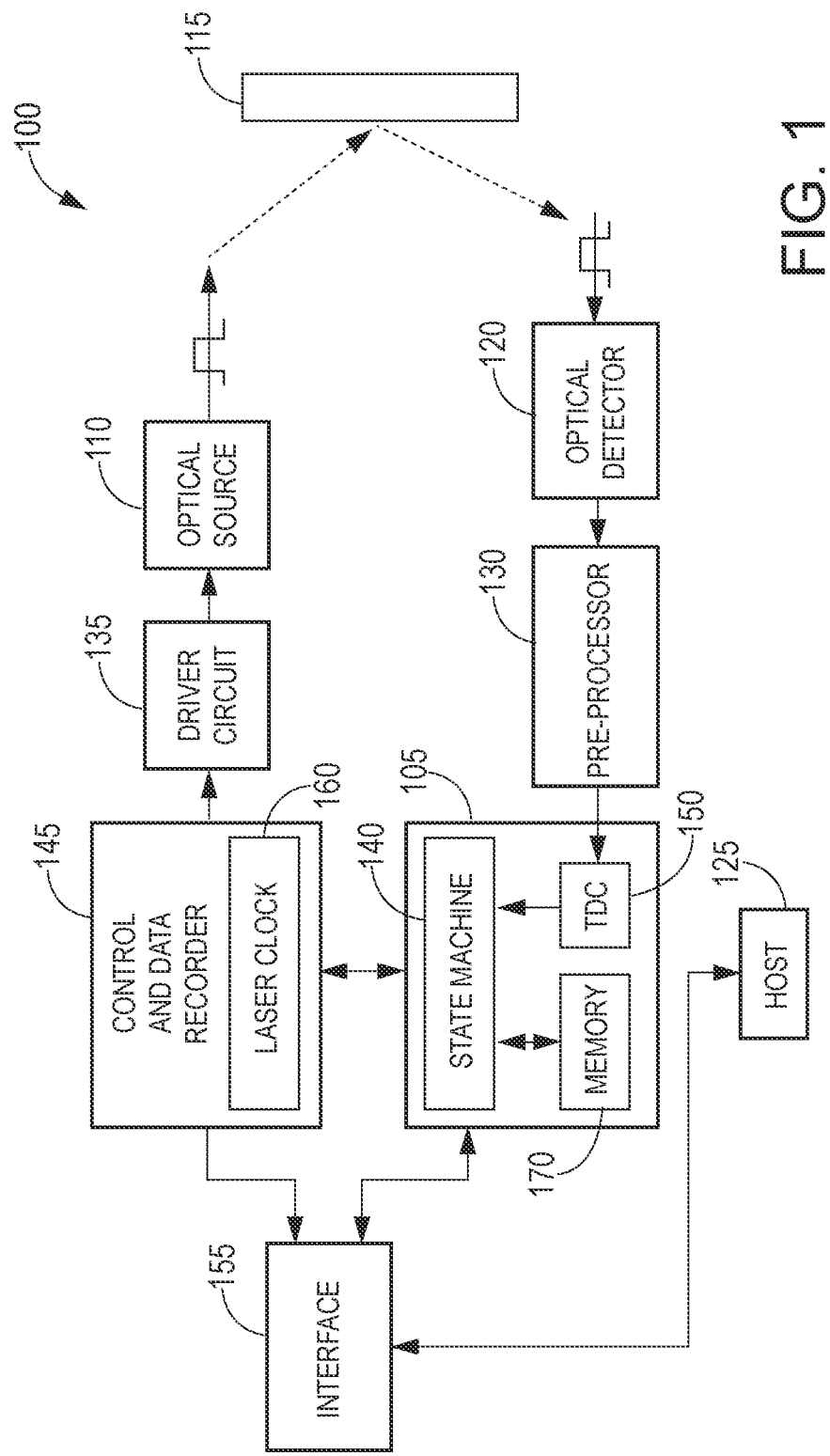
FIG. 1 is a block diagram of a system in accordance with an exemplary embodiment of the present technology.
Figure 2:
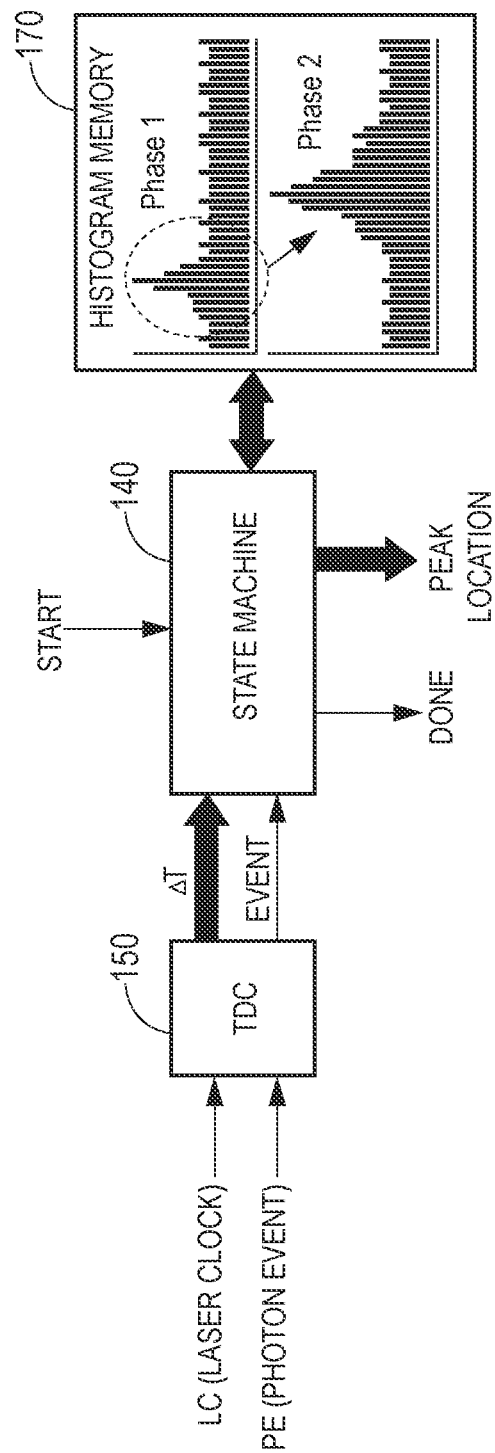
FIG. 2 is a partial block diagram of the system in accordance with an exemplary embodiment of the present technology.
Figure 3:
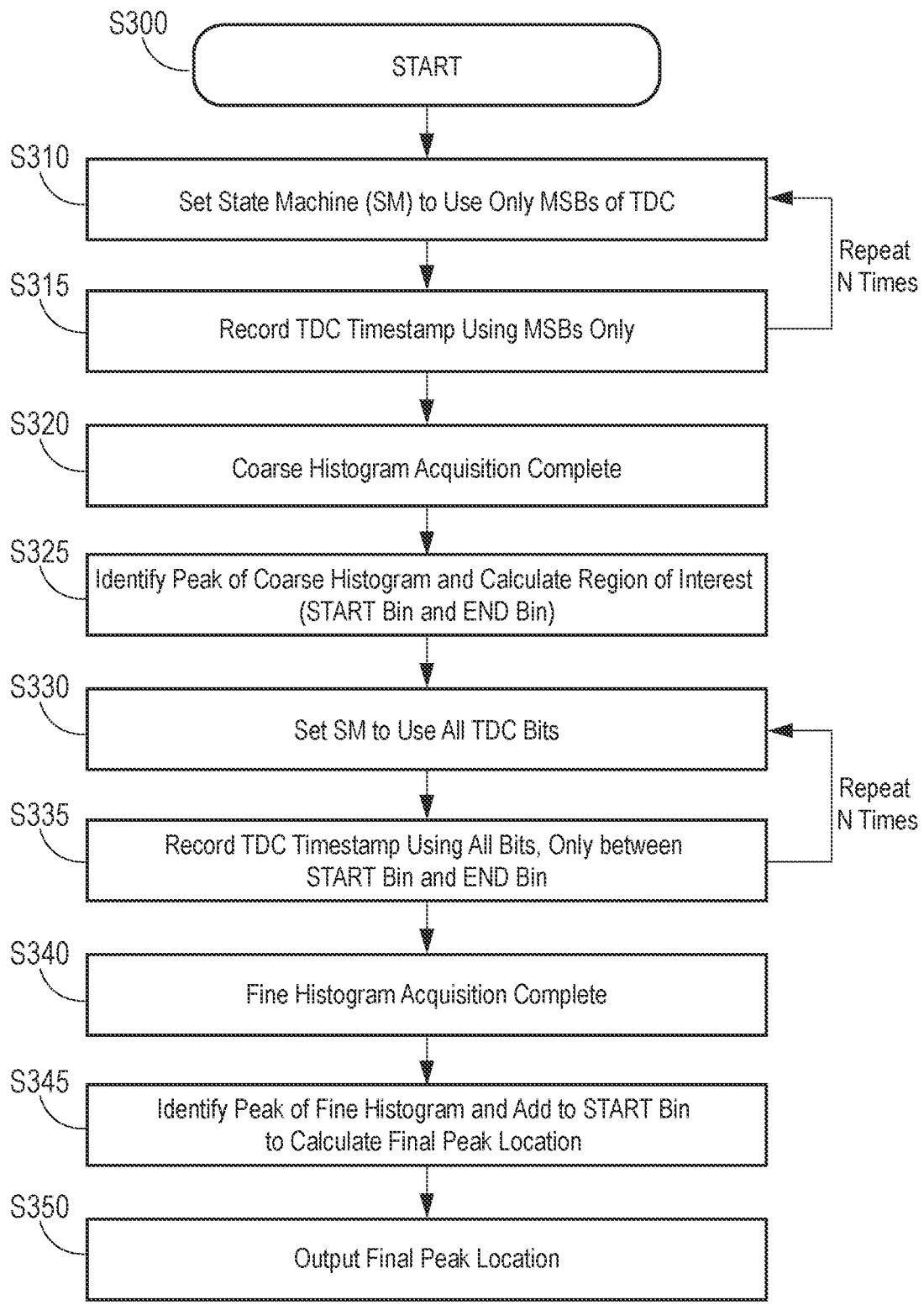
FIG. 3 is a flow chart for region of interest histogramming in accordance with an exemplary embodiment of the present technology.

Referring to FIGS. 1 and 2, methods and apparatus for region of interest histogramming according to various aspects of the present technology may be integrated in an active ranging sensor system 100, such as such as a light detection and ranging (LiDAR) system, configured to transmit a pulse, detect a reflected pulse, and determine a range to a target based on the time delay between the transmitted pulse to the detected pulse (i.e., the round trip delay). In general, LiDAR systems and other active ranging sensors may measure range to a target 115 by direct time of flight (the round trip delay). In this method, an optical source 110 (e.g., a laser), which is driven by a driver circuit 135, fires a laser pulse (transmission signal) at the target 115 and a returning photon reflected from the target 115 is detected by an optical detector 120, such as a single photon avalanche diode (SPAD) or silicon photomultipliers (SiPM). A number of SPADs may be arranged in an array (not shown), with each SPAD connected to its own dedicated processing circuitry, such as a pre-processor 130 and a processor 105. In other words, the system 100 may comprise a plurality of pre-processors and a plurality of processors, one for each SPAD.

The system 100 may further comprise a control and data recorder 145 configured to communicate with the processor 105 and pass (relay) the relevant information to a host 125 via an interface 155. The control and data recorder 145 may also receive configuration data from the host 125 via the interface 155. The control and data recorder 145 may use the configuration data from the host 125 to drive the driver circuit 135 and generate a laser clock signal. For example, the control and data recorder 145 may comprise a laser clock 160 to generate the laser clock signal. The configuration data may indicate a frequency for the laser clock signal and/or operation timing of the driver circuit 135. For example, the optical source 110 may fire a single laser pulse for each laser clock signal. The control and data recorder 145 may supply the laser clock signal to the processor 105.

In various embodiments, the control and data recorder 145 receive information from each SPAD in the SPAD array.

The interface 155 may be configured to relay various data and configuration data to/from various circuits in the system 100 and may comprise a number of I/O terminals to communicate with the processor 105, the control and data recorder 145, and the host 125. For example, the interface 155 may be configured to receive data from the processor 105, send configuration signals to the processor 105, send data to the host 125, and receive configuration signals from the host 125.

The host 125 may comprise a computer or microprocessor to control peripheral systems, such as an advanced driver assistance system in an automobile, according to data received from the interface 155 and/or processor 105.

The pre-processor 130 may be configured to receive an input signal from the optical detector 120, amplify the input signal, and/or determine if the input signal exceeds a predetermined value or accept or reject the input signal based on its characteristics (e.g., amplitude or frequency). If the input signal does not exceed the predetermined value, this may indicate that the signal represents noise and may not provide useful data. For example, the pre-processor 130 may comprise an amplifier (e.g., a high frequency amplifier, not shown) and a discriminator circuit (not shown). The pre-processor 130 may produce an output signal only if the input signal exceeds the predetermined value and transmit the output signal (EVENT) to the processor 105 for further processing. In an exemplary embodiment, the output signal of the pre-processor 130 represents a photon event and may be represented as a binary code comprising any number of bits.

The processor 105 may be configured to receive data from the pre-processor 130/optical detector 120, convert the data to time data, build a histogram with the time data, and determine a peak in the histogram. The processor 105 may also be in communication with the control and data recorder 145 and receive the laser clock signal from the laser clock 160. In an exemplary embodiment, the processor 105 may comprise a time-to-digital converter (TDC) 150, a memory 170, and a state machine 140.

According to an exemplary embodiment, the TDC 150 may be configured to convert the output signal EVENT from the pre-processor 130/optical detector 120 to time data (ΔT). The TDC 150 may comprise a conventional TDC or any other circuit or system suitable for generating a TDC code that represents a time value or delta time (ΔT) (also referred to as a timestamp). In an exemplary embodiment, the delta time ΔT is the time of the output signal EVENT minus the time of the laser clock (i.e., ΔT=time of EVENT−time of laser clock). According to an exemplary embodiment, the TDC code may be represented as a binary code comprising any number of bits.

According to various embodiments, the state machine 140 operates in conjunction with the TDC 150 and a memory 170 to generate a histogram having a total number of histogram bins B.

The memory 170 may be configured to store a histogram of photon events based on the timestamp (delta time) of each photon event. The memory 170 may comprise any number of memory elements suitable for incrementing and storing a count value. For example, each memory element may be configured to increment and store a count value for each photon event that occurs for a particular timestamp. In addition, each memory element may correspond to a histogram bin, wherein each bin may have a width that corresponds to a range of TDC codes or a single TDC code. The state machine 140 may increment the count value for a particular memory element when a photon event occurs at a particular TDC code (timestamp), thus incrementing the count value of the associated histogram bin.

For example, the state machine 140 may receive the TDC code and the output signal EVENT from the TDC 150 and increment the count value of the histogram bin associated with the received TDC code. The state machine 140 may repeat this function a number of times to create a histogram of the photon events. After a predetermined number of repetitions, the state machine 140 may determine a peak location (i.e., peak bin) of the histogram, where the peak location is the bin with the highest count value.

In various embodiments, the state machine 140 may transmit a signal indicating the peak location (bin number with the highest count value) of the histogram to the control and data recorder 145. The control and data recorder 145 may translate the peak location into a distance of the target 115 from the optical source 110 and transmit the distance to the host 125 via the interface 155.

In various embodiments, the state machine 140 may determine a region of interest of a histogram from a first histogram phase based on the peak location. In an exemplary embodiment, the region of interest is centered at the peak location and is defined by a start bin (START) and an end bin (END).

The state machine 140 may compute the start and end bins based on the peak location and the total number of histogram bins. In some cases, the state machine 140 may also use a total number of virtual bins, which is the total number of possible TDC codes in the first phase, to compute the end bin. In an exemplary embodiment, if the peak location is greater than or equal to half the number of histogram bins, then the start bin is equal to the peak location minus half the total number of histogram bins plus 1 (i.e., START=peak−½B+1). Otherwise, the start bin is set to zero. If the peak location plus half the total number of histogram bins is less than the total number of virtual bins, then the end bin is equal to the peak location plus half the total number of bins (i.e., END=peak+½B). Otherwise, the end bin is equal to the total number of virtual bins. For example, the state machine 140 may perform an operation described using the following pseudo code:

```
IF Peak ≥ ½ bins
    START = Peak − ½ bins + 1
ELSE
    START = 0
IF Peak + ½ bins < Total Virtual Bins
    END = Peak + ½ bins
ELSE
    END = Total Virtual Bins
```

In various embodiments, the state machine 140 may use the region of interest in a second histogram phase. For example, after the first histogram phase is complete, the state machine 140 may create a second histogram using only those TDC codes that fall within the region of interest. During the second histogram phase, TDC codes that fall outside of the region of interest are ignored and are not used to create the second histogram. In various embodiments, the width of the histogram bins in the first histogram phase is greater than the width of the histogram bins in the second histogram phase.

For example, and referring to FIG. 4A, consider a case with 1000 virtual bins (TDC values 0 to 999) and 100 histogram bins, and where bin number 35 is the peak of the first histogram. In this instance, each histogram bin has a width of 10 in the first histogram phase and a width of 1 in the second histogram phase—providing a ratio of 10. Once the state machine 140 determines the peak location (in this case bin number 35) of the first histogram, the state machine 140 may convert the peak location into a virtual bin number based on the bin width of the second histogram phase by multiplying the bin number by the ratio (in this case 10). In other words, the state machine 140 converts the bin number with the highest count value to an equivalent bin location in the second histogram phase. Therefore, in this example, the state machine 140 determines that the peak location is 350 (35×10). The state machine 140 may then use the peak location from the first histogram (in this example, 350) to compute the region of interest, the start bin, and the end bin. For example, assuming a case with 1000 virtual bins, 100 histogram bins, and a ratio of 10 between the first phase and the second phase, if the peak location is less than 50, then histogramming starts at TDC value 0 for the second phase; otherwise histogramming starts at the TDC value equal to the peak value minus 49. If the number of virtual bins minus the peak location is less than 50, then histogramming stops at TDC value 999 for the second histogram phase; otherwise histogramming stops at the TDC value that equals the peak location plus 50.

According to various embodiments, the state machine 140 may be implemented using a field programmable gate array, an application specific integrated circuit, other hardware, and the like.

Various embodiments of the present technology may provide a system 100 that increases time of fight resolution at all ranges, lowers memory requirements, is suitable for long range and short range LiDAR systems, reduces TDC size requirements, and can perform quickly without limiting the system frame rate may be desired. In various embodiments, this is achieved by performing region of interest histogramming comprising a first, course histogram phase followed by a second, fine histogram phase.

Embodiments of the present technology allow for high resolution time of flight measurement at any range without the need for additional memory resources, while maintaining a high frame rate. In addition, embodiments of the present technology may be utilized in various applications, such as long range LiDAR, short range LiDAR, in-cabin monitoring, robotic/consumer LiDAR, and the like.

In an exemplary embodiment, and referring to FIGS. 1-3 and 4A-4C, the control and data recorder 145 may generate a start signal and transmit the start signal to the state machine 140 to commence operation of the state machine (S300). The laser clock 160 may generate the laser clock signal to trigger the optical source 110 to fire a laser pulse at the target 115. The optical detector 120 detects photons returned/reflected from the target 115 and reports the detected photon to the TDC 150. The TDC 150 may then report the TDC code and the photon event to the state machine 140.

During the first histogram phase, the control and data recorder 145 may set the state machine 140 to utilize only a portion of the TDC codes, such as the most significant bits of the TDC codes (S310). The state machine 140 may create the course histogram according to the portion of bits from each TDC code and any contemporaneous photon events (S315). For example, the state machine 140 may utilize the memory 170 to track the number of photon events that occur at a particular timestamp (represented by a TDC code) by incrementing the count value of the memory element corresponding to the timestamp. Since the state machine 140 is recording only a portion of bits of the TDC code, the course histogram has a fixed number of bins, wherein each bin has a width greater than 1. The first phase is deemed completed after the state machine 140 has recorded a number of timestamps from the TDC 150 (S320).

After the first histogram phase is complete, the state machine 140 may identify or otherwise determine a first peak location of the first histogram (S325). For example, the state machine 140 may identify the memory element that has the highest count value. The state machine 140 may also determine the region of interest based on the first peak location (S325). In an exemplary embodiment, the region of interest is centered at the peak location and is defined by the start bin and the end bin, as described above. For example, and referring to FIGS. 4A-4C, during the first histogram phase, the histogram bin located at about 350 is the peak bin (i.e., peak location). In this example, the region of interest that will be used for the second histogram phase has a start bin of 300 and an end bin of 400. Thus, during the second histogram phase, only those photon events that occur between 300 and 400 will be counted and all others outside of the region of interest will be ignored.

After the first histogram phase is complete, the control and data recorder 145 may then set the state machine 140 to use all bits of the TDC codes in the second histogram phase (S330). This results in the width of the bins of the second histogram to be smaller than that of the first histogram. The state machine 140 may create the second, fine histogram according to all bits from each TDC code that occur within the region of interest and any contemporaneous photon events (S335). For example, the state machine 140 may utilize the memory 170 to track the number of photon events that occur at a particular timestamp (represented by a TDC code) by incrementing the count value of the memory element corresponding to the timestamp. The second histogram phase is deemed completed after the state machine 140 has recorded the all the timestamps from the TDC 150 that fall within the region of interest (S340).

After the second histogram phase is complete, the state machine 140 may identify or otherwise determine a second peak location of the second histogram (e.g., bin 45, FIG. 4C). The state machine 140 may then add the value of the start bin of the region of interest (e.g., 300) to the value of the second peak location in order to convert the timestamp of the second histogram to a value that corresponds to an initial virtual bin to provide the final peak location (e.g., 345=300+45) (S345). The final peak location is a high resolution location. The state machine 140 may then output the final peak location (e.g., 345) to the control and data recorder 145 and/or the interface 155.

In various embodiments, the system 100 may perform, at most, two histogram phases. This short measurement time provides an improved system frame rate, which is advantageous in LiDAR systems.

In various embodiments, the control and data recorder 145 may convert the final peak location to a range/distance and report the distance to the host 125 via the interface 155. The host 125 may use the distance information to initiate peripheral functions. For example, in a vehicle equipped with an ADAS, the vehicle may automatically engage the brakes or other safety functions.

In various embodiments, and referring to FIGS. 1-3 and 5A-5D, the system 100 may be configured to detect multiple peak locations in a first histogram from a first histogram phase (e.g., as illustrated in FIG. 5A), generate multiple regions of interest (e.g., as illustrated in FIGS. 5B-5D), and perform a second histogram phase using the multiple regions of interest from the first histogram. For example, the system 100 may detect multiple peaks in the first histogram by comparing the height of the histogram bins to a predetermined threshold value that is above a noise floor. The second histogram phase may comprise generating multiple histograms, one for each region of interest/each peak from the first histogram phase. In the present case, the number of bins for each region of interest in the second phase is a fraction of the number of bins from the first histogram. For example, as illustrated in FIGS. 5A-5D, the first histogram phase has 1000 virtual bins divided into 100 histogram bins and the first histogram has 2 peak locations. In the second histogram phase, each region of interest is defined by only 50 bins each, which is half of that used in the case of only one peak location.

In various embodiments, the number of virtual bins and the number of histogram bins for each histogram phase may be based on the requirements of a particular system, such as the TDC size, desired range resolution, the LiDAR range, and the like.

In various embodiments, the system 100 may utilize a smaller TDC compared to conventional systems. For example, in order to achieve 30 cm range resolution for long range (e.g., 300 m) automotive LiDAR applications, the present system 100 may utilize a 5-bit TDC. However, a conventional system would require a 10-bit TDC to achieve the same performance.

In various embodiments, the system 100 may utilize less memory compared to conventional systems. For example, a system required to image up to 90 meters with a TDC resolution of 100 ps would require 6000 histogram bins using conventional histogramming. A system using the region of interest histogramming method described above, only 400 bins would be required to range up to 96 meters with a bin resolution of 1.6 ns for the first phase followed by a resolution of 100 ps for the second phase. This provides a memory reduction of 15:1.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. An apparatus, comprising:
   a time-to-digital converter (TDC) configured to generate a plurality of signals, each signal having a total number of bits; and
   a state machine responsive to the TDC and configured to:
      create, in a memory, a first histogram of a first set of signals from the plurality of signals, wherein the first histogram has a fixed number of bins over a first range;
      determine a first peak bin from the first histogram;
      determine a region of interest of the first histogram based at least partially on a relationship between the first peak bin and half the fixed number of bins, wherein the region of interest is centered at the first peak bin and defined by a start bin and an end bin;
      create a second histogram of a second set of signals from the plurality of signals using the total number of bits, wherein the second histogram has the fixed number of bins over the region of interest and wherein the bins of the second histogram have a smaller width than the bins of the first histogram; and
      determine a second peak bin from the second histogram.

2. The apparatus according to claim 1, wherein the state machine uses less than the total number of bits to create the first histogram.

3. The apparatus according to claim 1, wherein the state machine is further configured to compute a high resolution peak location comprising adding a value of the start bin to a value of the second peak bin.

4. The apparatus according to claim 1, wherein determining the region of interest comprises computing the start bin and computing the end bin based on the first peak bin.

5. The apparatus according to claim 1, wherein the start bin is the first peak bin minus half the fixed number of bins plus 1.

6. The apparatus according to claim 1, wherein the end bin is the first peak bin plus half the fixed number of bins.

7. The apparatus according to claim 1, wherein creating the second histogram comprises tracking a number of photon events that occur at a timestamp using the total number of bits in the timestamp.

8. A method for histogramming, comprising:
with a state machine, receiving a plurality of signals from a time-to-digital converter;
with the state machine, performing a first histogramming phase comprising:
creating a first histogram of a first set of signals from the plurality of signals, wherein the first histogram has a fixed number of bins over a first range;
determining a first peak bin from the first histogram; and
determining a first region of interest of the first histogram based at least partially on a relationship between the first peak bin and half the fixed number of bins, wherein the first region of interest is centered at the first peak bin and defined by a start bin and an end bin; and
with the state machine, performing a second histogramming phase comprising:
creating a second histogram of a second set of signals from the plurality of signals, wherein the second histogram has the fixed number of bins over the first region of interest; and
determining a second peak bin from the second histogram.

9. The method according to claim 8, wherein each bin from the first histogram has a first width and each bin from the second histogram has a second width that is less than the first width.

10. The method according to claim 8, wherein performing the first histogramming phase further comprises determining a third peak bin from the first histogram and determining a second region of interest of the first histogram based on the determined third peak bin.

11. The method according to claim 10, wherein identifying the first and third peak bins comprises comparing a height of each bin from the first histogram to a predetermined threshold value.

12. The method according to claim 10, wherein performing the second histogramming phase further comprises creating a third histogram of the second set of signals, wherein the third histogram has the fixed number of bins over the second region of interest and identifying a fourth peak bin from the third histogram.

13. The method according to claim 8, wherein:
when the first peak bin is greater than or equal to half the fixed number of bins, the start bin is the first peak bin minus half the fixed number of bins plus 1;
when the first peak bin is less than half the fixed number of bins, the start bin is 0;
when the first peak bin plus half the fixed number of bins is less than a total number of virtual bins, the end bin is the first peak bin plus half the fixed number of bins, wherein the total number of virtual bins is equal to a total number of codes output by the time-to-digital converter; and
when the first peak bin plus half the fixed number of bins is greater than or equal to the total number of virtual bins, the end bin is equal to the total number of virtual bins.

14. A system, comprising:
a source configured to transmit a source signal;
a receiver configured to receive a reflected source signal and generate a reception signal according to the reflected source signal;
a time-to-digital converter (TDC) connected to the receiver and configured to generate a plurality of signals, each signal represented by a total number of bits;
a state machine responsive to the TDC and configured to:
create, in a memory, a first histogram of a first set of signals from the plurality of signals, wherein the first histogram has a fixed number of bins over a first range and each bin of the first histogram has a first width;
determine a first peak bin from the first histogram;
determine a first region of interest of the first histogram based at least partially on a relationship between the first peak bin and half the fixed number of bins, wherein the first region of interest is centered at the first peak bin and defined by a start bin and an end bin;
create a second histogram of a second set of signals from the plurality of signals, wherein the second histogram has the fixed number of bins over the first region of interest and each bin of the second histogram has a second width that is less than the first width;
determine a second peak bin from the second histogram; and
compute a high resolution peak location comprising adding a value of the start bin to a value of the second peak bin.

15. The system according to claim 14, wherein the state machine uses a portion of the total number of bits to create the first histogram and uses the total number of bits to create the second histogram.

16. The system according to claim 14, wherein determining the first region of interest comprises computing the start bin and computing the end bin based on the first peak bin.

17. The system according to claim 16, wherein:
the start bin is the first peak bin minus half the fixed number of bins plus 1; and
the end bin is the first peak bin plus half the fixed number of bins.

18. The system according to claim 14, wherein the state machine is further configured to:
determine a third peak bin from the first histogram; and
determine a second region of interest of the first histogram based on the third peak bin.

19. The system according to claim 18, wherein the state machine is further configured to:
create a third histogram using the second set of signals, wherein the third histogram has the fixed number of bins over the second region of interest; and
determine a fourth peak bin from the third histogram.

* * * * *